United States Patent
Sriram et al.

(10) Patent No.: US 12,388,681 B2
(45) Date of Patent: Aug. 12, 2025

(54) PREDICTIVE CHANNEL ESTIMATION FOR LOW LATENCY RECEIVER

(71) Applicant: Outdoor Wireless Networks LLC, Richardson, TX (US)

(72) Inventors: Suresh N. Sriram, Bangalore (IN); Arthur J. Barabell, Sudbury, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 452 days.

(21) Appl. No.: 18/055,264

(22) Filed: Nov. 14, 2022

(65) Prior Publication Data

US 2023/0155866 A1 May 18, 2023

Related U.S. Application Data

(60) Provisional application No. 63/279,283, filed on Nov. 15, 2021.

(51) Int. Cl.
*H04L 25/02* (2006.01)
*H04L 5/00* (2006.01)
(Continued)

(52) U.S. Cl.
CPC ........ *H04L 25/0228* (2013.01); *H04L 5/0051* (2013.01); *H04L 25/0256* (2013.01); *H04W 72/0446* (2013.01); *H04L 1/0063* (2013.01)

(58) Field of Classification Search
CPC ............... H04L 25/0228; H04L 5/0051; H04L 25/0256; H04L 1/0063; H04L 25/0204;
(Continued)

(56) References Cited

U.S. PATENT DOCUMENTS 11,483,191 B2 * 10/2022 Hellfajer ............. H04L 27/2663
2018/0070254 A1 3/2018 Hannan et al.
(Continued)

FOREIGN PATENT DOCUMENTS

WO 2011162723 A1 12/2011

OTHER PUBLICATIONS

International Searching Authority, "International Search Report and Written Opinion", from PCT Application No. PCT/US2020/079822 from Foreign Counterpart to U.S. Appl. No. 18/055,264, Mar. 14, 2023, Page (s) 1 through 10, Published in: WO.

*Primary Examiner* — Dady Chery
(74) *Attorney, Agent, or Firm* — Fogg & Powers LLC

(57) ABSTRACT

One embodiment is directed to adaptive predictive uplink receive chain processing that involves determining predicted data for one or more early data symbols of a slot based on first baseband IQ data received for the slot. The predicted data for the early data symbols of the slot comprises a predicted version of data used at some point in performing a first portion of uplink receive processing for the early data symbols. The first portion of the uplink receive processing for the early data symbols of the slot is performed using the predicted data. Actual data corresponding to the predicted data is determined based on at least second baseband IQ data received for the slot. In connection with performing a remaining portion of the uplink receive processing for the early data symbols, the preliminary output data for the early data symbols of the slot are adapted based on the actual data.

40 Claims, 4 Drawing Sheets

(51) Int. Cl.
*H04W 72/0446* (2023.01)
*H04L 1/00* (2006.01)

(58) Field of Classification Search
CPC ......... H04L 25/03968; H04L 25/0224; H04W 72/0446
See application file for complete search history.

(56) References Cited

U.S. PATENT DOCUMENTS

2018/0287673 A1* 10/2018 Chang ................. H04L 25/0224
2020/0090664 A1* 3/2020 Moriya ................. G10L 19/005
2020/0313692 A1* 10/2020 Berg ................... H03M 7/6041
2020/0322204 A1 10/2020 Lu et al.
2021/0160802 A1 5/2021 Sandberg et al.
2024/0235898 A1* 7/2024 Enescu ............... H04L 25/0254

* cited by examiner

PREDICTIVE CHANNEL ESTIMATION FOR LOW LATENCY RECEIVER

CROSS-REFERENCE TO RELATED APPLICATIONS

This application claims the benefit of U.S. Provisional Patent Application Ser. No. 63/279,283, filed on Nov. 15, 2021, which is hereby incorporated herein by reference in its entirety.

BACKGROUND

FIG. 1 is a block diagram illustrating one example slot configuration for wireless communication using the Fifth Generation (5G) New Radio (NR) air interface defined by the 3rd Generation Partnership Project (3GPP). (Although FIG. 1 is described in connection with a 5G NR example, it is to be understood that these principles also apply to other air interfaces such as Fourth Generation (4G) Long Term Evolution (LTE).)

As shown in FIG. 1, each slot 100 comprises 14 Orthogonal Frequency Division Multiplexing (OFDM) symbols 102. In 5G NR, the duration $T_{sym}$ of each slot is configurable and based on the "numerology" being used. For example, for a numerology of 0 with 15 kilohertz (kHz) subcarrier spacing, the slot duration is 1 millisecond (ms). For a numerology of 1 with 30 kHz subcarrier spacing, the slot duration is 0.5 ms. For a numerology of 2 with 60 kHz subcarrier spacing, the slot duration is 0.25 ms. For a numerology of 3 with 120 kHz subcarrier spacing, the slot duration is 0.125 ms. For a numerology of 4 with 240 kHz subcarrier spacing, the slot duration is 0.0625 ms. For a numerology of 5 with 480 kHz subcarrier spacing, the slot duration is 0.0312 ms.

For uplink transmissions on the Physical Uplink Shared Channel (PUSCH), the OFDM symbols 102 for a given slot are received one after another at the base station (also referred to as a "g NodeB" or "gNB"). For a given slot 100, some of the symbols 102 are used to transmit reference signals (and also referred to here as "reference signal symbols" or "reference symbols") 104. For 5G NR, these reference signals include Demodulation Reference Signals (DMRS), which are used for channel estimation, and Phase Tracking Reference Signals (PTRS), which are used for tracking the phase of oscillators in the gNB and user equipment (UE). The other symbols 102 are used for transmitting user data and are referred to here as "data symbols" 106.

As shown in FIG. 1, the reference signals 104 for the slot 100 are not transmitted before all data symbols 106 are transmitted. Instead, some data symbols 106 are transmitted before the first reference symbol 104 is transmitted for the slot 100. The data symbols 106 transmitted before the first DMRS reference symbol 104 are also referred to here as "pre-DMRS data symbols," and the data symbols 106 transmitted after the first DMRS reference symbol 104 are also referred to here as "post-DMRS data symbols." In the example shown in FIG. 1, DMRS reference symbols 104 are transmitted in the fourth and eleventh symbols (which are labeled "Symbol 3" and Symbol 10," respectively, in FIG. 1). In such an example, the first three symbols of the slot 100 are data symbols 106 (which are labeled "Symbol 0," "Symbol 1," and Symbol 2," respectively, in FIG. 1) and are the pre-DMRS data symbols 106 in this example. Typically, the uplink receive processing for the first three data symbols 106 is not started until after the DMRS reference symbol 104 transmitted in the fourth symbol of the slot 104 has been received at the base station. Doing this, however, adds latency to the uplink receive processing. In the example shown in FIG. 1, waiting to start the receive processing for the pre-DMRS data symbols 106 until after the DMRS reference symbol 104 transmitted in the fourth symbol of the slot 104 has been received at the base station adds an amount of latency equivalent to the duration of four symbols, which is greater than 25% of the overall slot duration in this example. For example, for a numerology of 0 with 15 kHz subcarrier spacing, waiting to start the receive processing for the pre-DMRS data symbols 106 until after the DMRS reference symbol 104 transmitted in the fourth symbol of the slot 100 has been received at the base station adds 0.288 ms of latency.

SUMMARY

One embodiment is directed to an apparatus for use in implementing a base station to provide wireless service. The apparatus comprises an uplink receiver chain configured to process a plurality of data symbols for a slot. The apparatus is configured to receive first baseband IQ data and second baseband IQ data for said slot and determine predicted data for said one or more early data symbols of said slot based on the first baseband IQ data received for said slot. The predicted data for said one or more early data symbols of said slot comprises a predicted version of data used at some point in performing a first portion of uplink receive processing for said one or more early data symbols of said slot. The apparatus is also configured to perform the first portion of the uplink receive processing for said one or more early data symbols of said slot using the predicted data in order to produce preliminary output data for said one or more early data symbols of said slot and determine actual data corresponding to the predicted data. The actual data is determined based on at least the second baseband IQ data received for said slot. The apparatus is configured to, in connection with performing a remaining portion of the uplink receive processing for said one or more early data symbols, adapt the preliminary output data for said one or more early data symbols of said slot based on the actual data. In one implementation, the predicted data comprises respective predicted channel estimates for one or more pre-DMRS data symbols of said slot.

Another embodiment is directed to software for use in implementing a base station to provide wireless service. The software comprises program instructions embodied on a non-transitory storage medium from which at least one programmable device reads at least some of the program instructions for execution thereby. The program instructions are configured to implement an uplink receiver chain configured to process a plurality of uplink symbols for a slot. The program instructions are further configured to cause the at least one programmable device to receive first baseband IQ data and second baseband IQ data for said slot and determine predicted data for said one or more early data symbols of said slot based on the first baseband IQ data received for said slot. The predicted data for said one or more early data symbols of said slot comprises a predicted version of data used at some point in performing a first portion of uplink receive processing for said one or more early data symbols of said slot. The program instructions are further configured to cause the at least one programmable device to perform the first portion of the uplink receive processing for said one or more early data symbols of said slot using the predicted data in order to produce preliminary output data for said one or more early data symbols of said slot and determine actual data corresponding to the predicted data. The actual data is determined based on at least the second baseband IQ data received for said slot. The program instructions are further configured to cause the at least one programmable device to, in connection with performing a remaining portion of the uplink receive processing for said one or more first uplink symbols, adapt the preliminary output data for said one or more early data symbols of said slot based on the actual data. In one implementation, the predicted data comprises respective predicted channel estimates for one or more pre-DMRS data symbols of said slot.

Another embodiment is directed to a base station to provide wireless service. The base station comprises at least one remote unit (RU) comprising at least one antenna and at least one distributed unit (DU) comprising a network interface to communicatively couple the DU to the RU and an uplink receiver chain configured to process a plurality of uplink symbols for a slot. The DU is configured to receive first baseband IQ data and second baseband IQ data for said slot and determine predicted data for said one or more early data symbols of said slot based on the first baseband IQ data received for said slot. The predicted data for said one or more early data symbols of said slot comprises a predicted version of data used at some point in performing a first portion of uplink receive processing for said one or more early data symbols of said slot. The DU is also configured to perform the first portion of the uplink receive processing for said one or more early data symbols of said slot using the predicted data in order to produce preliminary output data for said one or more early data symbols of said slot and determine actual data corresponding to the predicted data. The actual data is determined based on at least the second baseband IQ data received for said slot. The DU is also configured to, in connection with performing a remaining portion of the uplink receive processing for said one or more first uplink symbols, adapt the preliminary output data for said one or more early data symbols of said slot based on the actual data. In one implementation, the predicted data comprises respective predicted channel estimates for one or more pre-DMRS data symbols of said slot.

Another embodiment is directed to a method of uplink receive processing of a plurality of uplink symbols for a slot. The method comprises receiving first baseband IQ data and second baseband IQ data for said slot and determining predicted data for said one or more early data symbols of said slot based on the first baseband IQ data received for said slot. The predicted data for said one or more early data symbols of said slot comprises a predicted version of data used at some point in performing a first portion of uplink receive processing for said one or more early data symbols of said slot. The method further comprises determining predicted data for performing a first portion of uplink receive processing for one or more uplink symbols of said slot. The predicted data for said one or more early data symbols of said slot is determined based on the first baseband IQ data received for said slot. The method further comprises performing the first portion of the uplink receive processing for said one or more early data symbols of said slot using the predicted data in order to produce preliminary output data for said one or more early data symbols of said slot and determining actual data corresponding to the predicted data. The actual data is determined based on at least the second baseband IQ data received for said slot. The method further comprises, in connection with performing a remaining portion of the uplink receive processing for said one or more first uplink symbols, adapting the preliminary output data for said one or more early data symbols of said slot based on the actual data. In one implementation, the predicted data comprises respective predicted channel estimates for one or more pre-DMRS data symbols of said slot.

Other embodiments are disclosed.

The details of various embodiments are set forth in the accompanying drawings and the description below. Other features and advantages will become apparent from the description, the drawings, and the claims.

DRAWINGS

Figure 4:
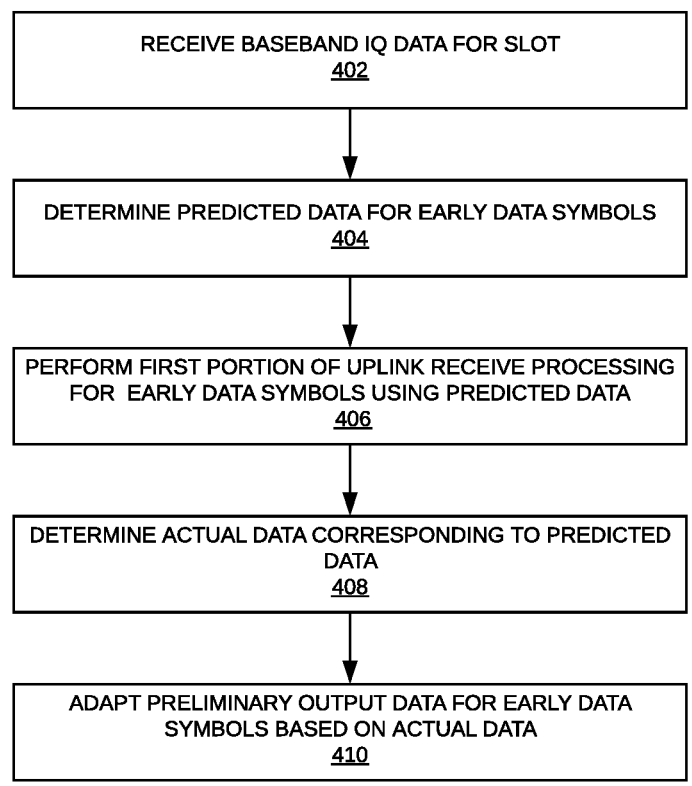

FIG. 4 comprises a high-level flowchart illustrating one exemplary embodiment of a method of uplink receiving processing using predictive data for low latency.

Like reference numbers and designations in the various drawings indicate like elements.

DETAILED DESCRIPTION

Figure 2:
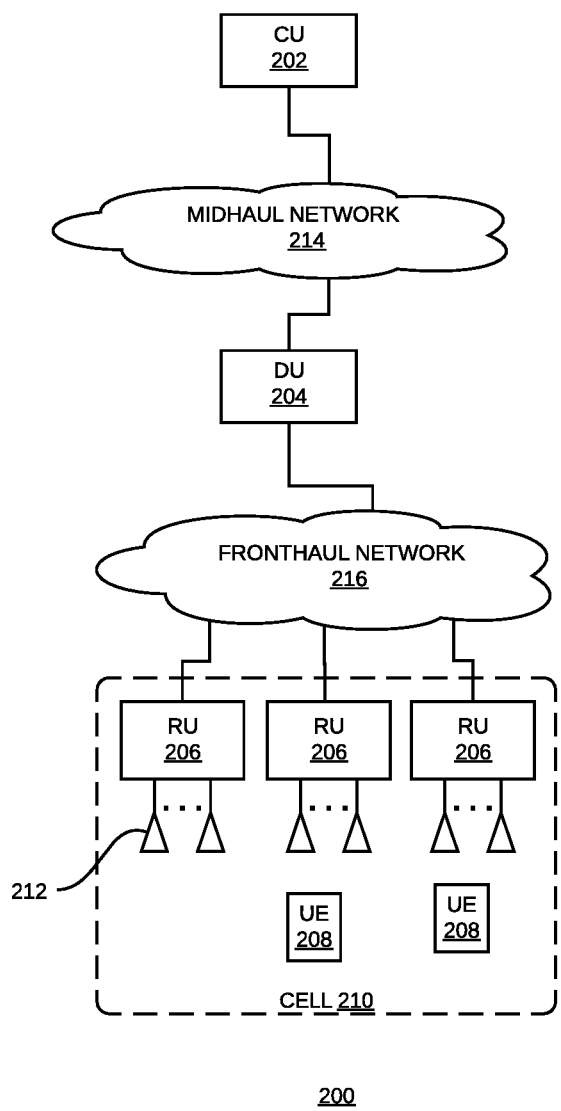
FIG. 2 is a block diagram illustrating one exemplary embodiment of a 5G NR base station in which the techniques for predictive and adaptive channel estimation for low latency uplink receive processing described below can be used.

FIG. 2 is a block diagram illustrating one exemplary embodiment of a 5G NR base station (gNB) 200 in which the techniques for predictive and adaptive channel estimation for low latency uplink receive processing described below can be used. In the particular exemplary embodiment shown in FIG. 2, the gNB 200 is implemented in a distributed manner in which the gNB 200 is partitioned into one or more central units (CUs) 202, one or more distributed units (DUs) 204, and one or more remote units (RUs) 206. In this exemplary embodiment the gNB 200 is configured so that each CU 202 is configured to serve one or more DUs 204 and each DU 204 is configured to serve one or more RUs 206. In the particular configuration shown in FIG. 2, a single CU 202 serves a single DU 204, and the DU 204 shown in FIG. 2 serves three RUs 206. However, the particular configuration shown in FIG. 2 is only one example; other numbers of CUs 202, DUs 204, and RUs 206 can be used. Also, the number of DUs 204 served by each CU 202 can vary from CU to CU; likewise, the number of RUs 206 served by each DU 204 can vary from DU to DU.

In general, the distributed gNB 200 is configured to provide wireless service to various items of user equipment (UEs) 208 using one or more cells 210 (only one of which is shown in FIG. 2 for ease of illustration). Each RU 206 includes or is coupled to a respective set of one or more antennas 212 via which downlink RF signals are radiated to UEs 208 and via which uplink RF signals transmitted by UEs 208 are received.

In one configuration (used, for example, in indoor deployments), each RU 206 is co-located with its respective set of antennas 212 and is remotely located from the DU 204 and CU 202 serving it as well as the other RUs 206. In another configuration (used, for example, in outdoor deployments), the respective sets of antennas 212 for multiple RUs 206 are deployed together in a sectorized configuration (for example, mounted at the top of a tower or mast), with each set of antennas 212 serving a different sector. In such a sectorized configuration, the RUs 206 need not be co-located with the respective sets of antennas 212 and, for example, can be co-located together (for example, at the base of the tower or mast structure) and, possibly, co-located with its serving DUs 204. Other configurations can be used.

In the exemplary embodiment shown in FIG. 2, each CU 202 is configured to implement Layer 3 and non-time critical Layer 2 functions for the base station 200. In this embodiment, each DU 204 is configured to implement the time-critical Layer-2 functions for the base station 200 and some Layer-1 functions for the base station 200 (these Layer-1 functions also referred to here as the "upper" Layer-1 functions). In this embodiment, each RU 206 is configured to implement the Layer-1 functions not implemented by its serving DU 204 (also referred to here as the "lower" Layer-1 functions) as well as the radio frequency (RF) functions. The functional split of the base station functions between each DU 204 and the one or more RUs 206 served by the DU 204 depends on which functional split option is used. In this exemplary embodiment, a so-called "option 7.x" functional split is used, where the functional split between the DU 204 and RU 206 occurs in Layer-1. However, it is to be understood that other functional splits can be used.

In the exemplary embodiment shown in FIG. 2, the CU 202 is communicatively coupled to each DU 204 served by the CU 202 over a midhaul network 214 (for example, a network that supports the Internet Protocol (IP)), and each DU 204 is communicatively coupled to each RU 206 served by the DU 204 using a fronthaul network 216 (for example, a switched Ethernet network that supports the IP). Each CU 202, DU 204, and RU 206 include one or more network interfaces (for example, Ethernet network interfaces) to communicatively couple each such entity to the midhaul network 214 and/or the fronthaul network 216. The CU 202 can be communicatively coupled to each DU 204 and/or each DU 204 can be communicatively coupled to each RU 206 in other ways.

Each CU 202, DU 204, and RU 206, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.).

Moreover, each CU 202, DU 204, and RU 206 can be implemented as a physical network function (PNF) (for example, using dedicated physical programmable devices and other circuitry) and/or a virtual network function (VNF) (for example, using one or more general purpose servers (possibly with hardware acceleration) in a scalable cloud environment) and in different locations within an operator's network (for example, in the operator's "edge cloud" or "central cloud").

Each CU 202, DU 204, and RU 206, and any of the specific features described here as being implemented thereby, can be implemented in other ways.

The particular base station 200 shown in FIG. 2 is described as being implemented in a distributed manner for use in providing 5G NR wireless service. However, it is to be understood that the base station 200 can be implemented in other ways and/or to provide other types of wireless service (for example, to provide Fourth Generation (4G) Long-Term Evolution (LTE) wireless service). For example, the functions described here as being implemented by the CU 202 and DU 204 can be implemented together in, for example, a baseband unit (BBU) for use with a remote unit 206 that is communicatively coupled to the BBU using point-to-point Common Public Radio Interface (CPRI) communication links.

Figure 3:
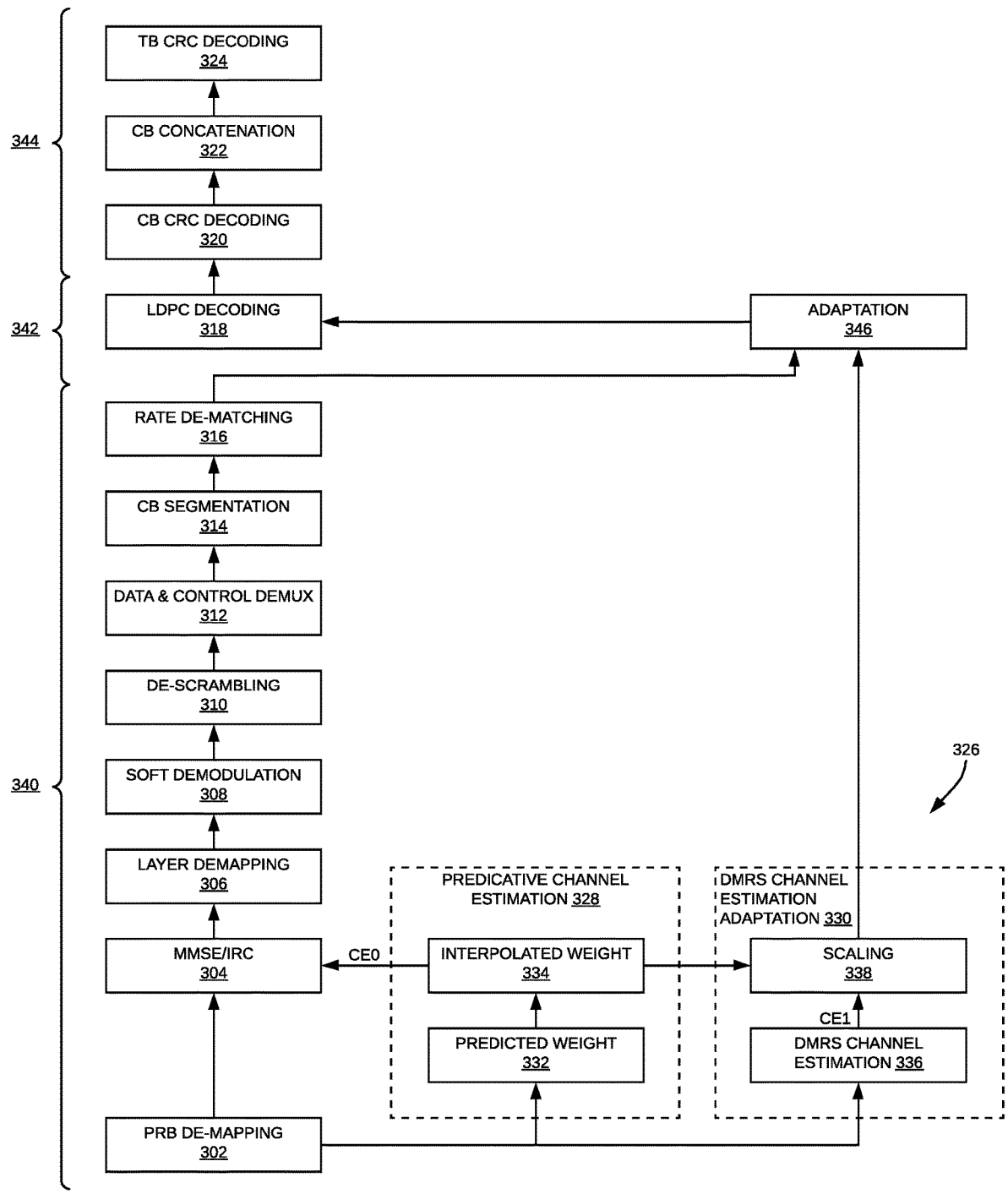
FIG. 3 is a block diagram illustrating one exemplary embodiment of an uplink receiver chain suitable for use in the base station shown in FIG. 2.

FIG. 3 is a block diagram illustrating one exemplary embodiment of an uplink receiver chain 300 suitable for use in the base station 200 shown in FIG. 2. In particular, the uplink receiver chain 300 shown in FIG. 3 is suitable for use as a part of the high PHY implemented by the DU 204. It is to be understood, however, that other embodiments can be implemented in other ways. For example, in one such alternative embodiment, a "functional split 8" between the DU 204 and the RUs 206 is used, in which case all of the physical layer processing is performed in the DU 204.

Except as explained below, the uplink receiver chain 300 shown in FIG. 3 implements a conventional 5G NR uplink receiver chain for processing the uplink frequency-domain in-phase and quadrature (IQ) data communicated from one or more RUs 206 over the fronthaul 218 to the DU 204 in order to decode the transport blocks transmitted by the UEs 208.

The uplink receiver chain 300 comprises a physical resource block (PRB) de-mapping function 302, a channel estimation and equalization function 304, a layer demapping function 306, a soft demodulation function 308, a de-scrambling function 310, a user and control data de-multiplexing function 312, a codeblock (CB) segmentation function 314, a rate de-matching function 316, a low density parity check (LDPC) decoding function 318, a codeblock cyclic redundancy check (CRC) decoding function 320, a codeblock concatenation function 322, and a transport block (TB) CRC decoding function 324.

In the exemplary embodiment shown in FIG. 3, the channel estimation and equalization function 304 is implemented using a Minimum Mean Square Error (MMSE) equalizer and an Interference Rejection Combining (IRC) function. Although the channel estimation and equalization function 304 is shown as a single, combined function that performs channel estimation, equalization, and any combining, it is to be understood that those functions can be implemented in other ways. For example, separate MMSE equalization and/or IRC combining functions can be used.

In the exemplary embodiment shown in FIG. 3, the uplink receiver chain 300 also comprises a two-stage channel estimation function 326. The two-stage channel estimation function 326 includes a predictive channel estimation function 328 and a DMRS channel estimation adaptation function 330. The equalization performed by the channel estimation and equalization function 304 for at least the pre-DMRS data symbols is based on only a predictive channel estimate (CE0) produced by the predictive channel estimation function 328. The LDPC decoding performed by the LDPC decoding function 318 for at least the pre-DMRS data symbols is based on log likelihood ratio (LLR) values that correspond to the one IQ constellation being used for the corresponding modulation order, where the LLR values have been adapted using a DMRS-based channel estimate CE1 produced by the DMRS channel estimation function 330. One example of how this can be done is described below in connection with FIG. 4.

FIG. 4 comprises a high-level flowchart illustrating one exemplary embodiment of a method 400 of uplink receiving processing using predictive data for low latency. The embodiment of method 400 shown in FIG. 4 is described here as being implemented using the base station 200 described above in connection with FIG. 2 and the uplink receiver chain 300 described above in connection with FIG. 3, though it is to be understood that other embodiments can be implemented in other ways. For example, in other embodiments, the method 400 and the uplink receiver chain 300 are used with 4G LTE base stations and UEs.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling. Moreover, one or more aspects of method 400 can be configurable or adaptive (either manually or in an automated manner).

The embodiment of method 400 shown in FIG. 4 is described with respect to being performed for a single slot (referred to as "the slot" in the following description). It is to be understood that the processing of method 400 can be performed for more than one slot (for example, for every slot while the base station 200 is being operated in a particular mode).

Method 400 comprises receiving baseband IQ data for the slot (block 402). In the exemplary embodiment described here as being implemented using the base station 200 of FIG. 2 and the uplink receiver chain 300 of FIG. 3 in which a functional 7-2 split is used, analog uplink radio frequency signals transmitted from UEs 208 are received at each RU 206 serving the cell 210, uplink time-domain baseband IQ data is produced by the RF functions in each RU 206, and uplink frequency-domain baseband IQ data is produced by the low PHY functions implemented in each RU 206. The frequency-domain baseband IQ data necessary for the uplink processing to be performed by the uplink receiver chain 300 is communicated over the fronthaul 216 from each RU 206 serving the cell 210 to the DU 204. This frequency-domain baseband IQ data can be compressed (for example, using one or more of the compression techniques described in the O-RAN family of specifications), in which case the DU 204 would need to decompress baseband IQ data. As noted above, other embodiments can be implemented in other ways. The generation and communication of frequency-domain baseband IQ data is done on a symbol-by-symbol basis such that the baseband IQ data for each symbol of the slot is received at the DU 204 (and the uplink receiver chain 300) one after another in the order in which the symbols are transmitted over the air from the respective UE 208.

Method 400 further comprises determining predicted data for performing a first portion of uplink receive processing for one or more early data symbols of the slot (block 404). The "early" data symbols are "early" in the sense that the baseband IQ data for these symbols is received before "other" baseband IQ data is received, where this "other" baseband IQ data is used to determine data needed at some point in the first portion of the uplink receive processing. This data needed at some point in the first portion of the uplink receive processing is also referred to here as "needed data." If this "other" baseband IQ data used to determine the needed data has not been received, a predicted version of the needed data (that is, the "predicted data") can be determined and used in place of an "actual" version of the needed data determined from such other baseband IQ data.

Figure 1:
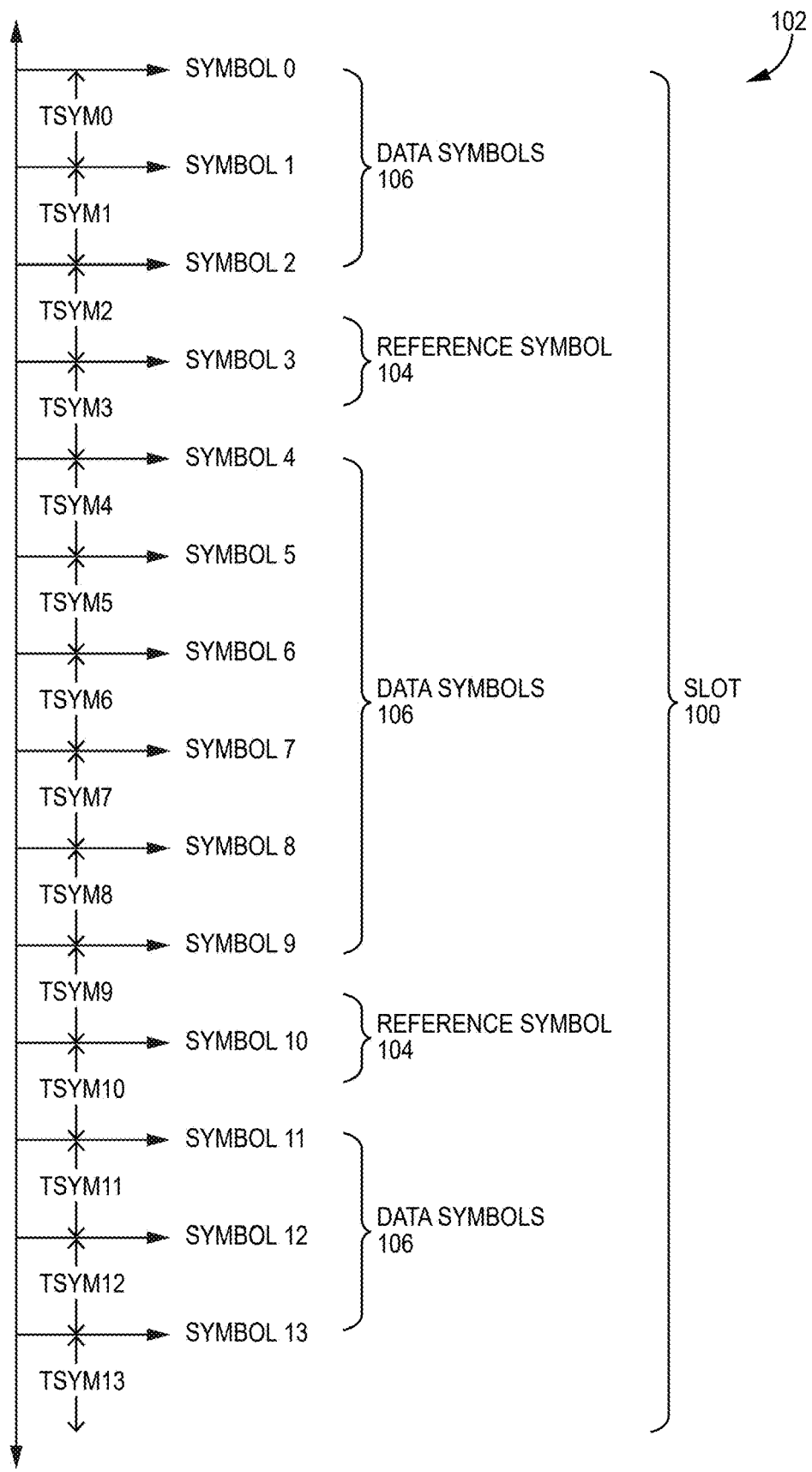
FIG. 1 is a block diagram illustrating one example slot configuration for wireless communication using the 5G NR air interface.

In the exemplary embodiment described here in connection with the uplink receiver chain 300 shown in FIG. 3, the uplink symbols for the slot comprise a plurality of data symbols and at least one demodulation reference signal (DMRS) symbol. In particular, the plurality of data symbols for the slot comprise one or more pre-DMRS data symbols that precede a first DMRS symbol for the slot and, in this embodiment, the one or more early data symbols for which the predicted data is determined comprises the one or more pre-DMRS data symbols for the slot. Also, in this embodiment, the data needed at some point in performing a first portion of uplink receive processing comprises a channel estimate for the slot, and the predicted data is determined by determining a respective predicted channel estimate CE0 for each pre-DMRS data symbol. That is, the predicted data comprises predicated channel estimates CE0 for the pre-DMRS data symbols. The respective predicted channel estimate CE0 for each pre-DMRS data symbol is determined based on the baseband IQ data received for that pre-DMRS data symbol. For the configuration shown in FIG. 1, the pre-DMRS data symbols comprise the first three data symbols 106 of each slot 100 and the first DMRS symbol 104 is transmitted in the fourth symbol of each slot 100 (though it is to be understood that this is just one example and that other configurations can be used).

In the exemplary embodiment described here in connection with the uplink receiver chain 300 shown in FIG. 3, a respective predicted channel estimate CE0 for each pre-DMRS data symbol is determined by the predictive channel estimation function 328. More specifically, in this exemplary embodiment, the predictive channel estimation function 328 is configured to predict coefficient values for the DMRS-based channel estimate CE1 that will ultimately be determined for the slot from the DMRSs that will subsequently be transmitted during the first DMRS symbol of the slot. In this embodiment, the DMRS-based channel estimate CE1 that will ultimately be determined for each slot comprises a plurality of coefficient values, each subcarrier having a respective coefficient value included in the plurality of coefficient values. The respective predicted channel estimate CE0 for each pre-DMRS data symbol of each slot comprises a respective predicted value for each of the coefficient values of the DMRS-based channel estimate that will ultimately be determined for the slot.

In the exemplary embodiment described here in connection with the uplink receiver chain 300 shown in FIG. 3, the predictive channel estimation function 328 comprises a predicted weight function 332 and an interpolated weight function 334. In this embodiment, for each pre-DMRS data symbol of each slot, the predictive channel estimation function 328 is configured so that the predicted weight function 332 determines the respective predicted value for each subcarrier for which data is transmitted during that pre-DMRS data symbol using the associated baseband IQ data. Also, in this embodiment, for each pre-DMRS data symbol of each slot, the predictive channel estimation function 328 is configured so that the interpolated weight function 334 determines the respective predicted value for each subcarrier for which data is not transmitted during that pre-DMRS data symbol by interpolating the predicted values determined by the predicted weight function 332 for that pre-DMRS data symbol.

In one implementation of this exemplary embodiment, for each pre-DMRS data symbol of each slot, the predicted weight function 332 is configured to determine the respective predicted values for the subcarriers for which data is transmitted during that pre-DMRS data symbol using received signal strength indicator (RSSI) values determined from the respective baseband IQ data received for those subcarriers during that pre-DMRS data symbol. As noted above, the interpolated weight function 334 determines the respective predicted value for each subcarrier for which data is not transmitted during the pre-DMRS data symbol by interpolating the predicted values determined by the predicted weight function 332 for that pre-DMRS data symbol.

In a second implementation of this exemplary embodiment, for each pre-DMRS data symbol of each slot, the predicted weight function 332 is configured to determine the respective predicted values for the subcarriers for which data is transmitted during that pre-DMRS data symbol by adapting the corresponding coefficient values included in the DMRS-based channel estimate CE1 determined for a prior slot using the respective baseband IQ data received for those subcarriers during that pre-DMRS data symbol. Again, as noted above, the interpolated weight function 334 determines the respective predicted value for each subcarrier for which data is not transmitted during the pre-DMRS data symbol by interpolating the predicted values determined by the predicted weight function 332 for that pre-DMRS data symbol.

In a third implementation of this exemplary embodiment, the predicted weight function 332 is configured to determine the respective predicted values for the subcarriers for which data is transmitted during that pre-DMRS data symbol by adapting respective moving averages of the corresponding coefficient values included in the DMRS-based channel estimates CE1 determined for a predetermined number of prior slots using the respective baseband IQ data received for those subcarriers during that pre-DMRS data symbol. Again, as noted above, the interpolated weight function 334 determines the respective predicted value for each subcarrier for which data is not transmitted during the pre-DMRS data symbol by interpolating the predicted values determined by the predicted weight function 332 for that pre-DMRS data symbol.

In other implementations, the predicted channel estimate can be determined in other ways. For example, the predictive weight can be determined from additional elements, such as previous slot UL weights, average of channel estimation over period, unused PRB's originating from the same UE, and any other reference signals from the UE (such as Phase Tracking Reference Signals (PTRS) and Tracking Reference Signals (TRS)) that appear before the associated DMRS.

Method 400 further comprises performing the first portion of the uplink receive processing for the one or more early data symbols of the slot using the predicted data (block 406).

The results of performing the first portion of the uplink receive processing for the one or more early data symbols of the slot using the predicted data is also referred to here as the "preliminary output data" for the one or more early data symbols of the slot.

In the exemplary embodiment described here in connection with the uplink receiver chain 300 shown in FIG. 3, this is done by performing a first portion of uplink receive processing for each pre-DMRS data symbol using only the respective predicted channel estimate CE0 determined for that pre-DMRS data symbol. In this embodiment, the first portion 340 of the uplink symbol processing comprises the PRB de-mapping function 302, channel estimation and equalization function 304, layer demapping function 306, soft demodulation function 308, de-scrambling function 310, user and control data de-multiplexing function 312, CB segmentation function 314, and rate de-matching function 316. The respective coefficient value included in the predicted channel estimate CE0 for each subcarrier for the pre-DMRS data symbol is used by the channel estimation and equalization function 304 to perform the equalization of the respective frequency-domain IQ data for that subcarrier of that pre-DMRS data symbol. In this embodiment, the preliminary output data comprises the results of performing the first portion of uplink receive processing for each pre-DMRS data symbol.

For each subcarrier of a data symbol, one or more bits of information are encoded as a symbol within a constellation, where the number of bits and constellations used depends on the modulation order that is employed by the transmitting UE 208 (for example, 1, 2, 4, 6, 8, 9, and 10 bits can be encoded using Binary Phase Shift Keying (BPSK), Quadrature Phase Shift Keying (QPSK), 16 Quadrature Amplitude Modulation (16QAM), 64 Quadrature Amplitude Modulation (64QAM), 265 Quadrature Amplitude Modulation (256QAM), 512 Quadrature Amplitude Modulation (512QAM), and 1024 Quadrature Amplitude Modulation (1024QAM), respectively).

In this embodiment, the first portion 340 of the uplink receive processing comprises the functions up to and including the rate de-matching function 316. The results of performing the first portion 340 of the uplink receive processing comprise one or more Log Likelihood Ratio (LLR) values for each subcarrier of each data symbol, where there is a separate LLR value for each bit communicated using that subcarrier of that data symbol and where the number of bits communicated depends on the modulation order used by the transmitting UE 208.

Method 400 further comprises determining actual data corresponding to the predicted data (block 408) and, in connection with performing a remaining portion of the uplink receive processing for the one or more early data symbols, adapting the preliminary output data for the one or more early data symbols of the slot based on the actual data (block 410). As noted above in connection with block 404, if baseband IQ data used to determine data needed at some point in the first portion of the uplink receive processing has not been received, a predicted version of the needed data (that is, the "predicted data") can be determined and used in place of an "actual" version of the needed data determined from such baseband IQ data. The "actual data corresponding to the predicted data" referred to here is this actual version of the needed data determined from such baseband IQ data. The preliminary output data resulting from performing the first portion of the uplink receive processing for the one or more early data symbols of the slot using the predicted data is adapted using (at least) the actual data (for example, to account for differences between the predicted data and the actual data). This adapted version of the results of performing the first portion of the uplink receive processing for the one or more early data symbols of the slot is then used (instead of the un-adapted preliminary output data) for performing the remaining portion of the uplink receive processing for the one or more early data symbols of the slot.

In the exemplary embodiment described here in connection with the uplink receiver chain 300 shown in FIG. 3, this is done by determining a DMRS-based channel estimate CE1 based on the baseband IQ data received for the first DMRS symbol, where the DMRS-based channel estimate CE1 is the actual data corresponding the respective predicted channel estimate CE0 determined for each pre-DMRS data symbol. The results of performing the first portion of uplink receive processing for each pre-DMRS data symbol are adapted based on the DMRS-based channel estimate CE1 in connection with performing the remaining portion of the uplink receive processing for that pre-DMRS data symbol.

In the exemplary embodiment described here in connection with the uplink receiver chain 300 shown in FIG. 3, the channel estimate adaptation function 330 includes a DMRS channel estimation function 336 that is configured to determine a DMRS-based channel estimate CE1 for each slot based on the baseband IQ data for the first DMRS symbol received for that slot. For example, the channel estimation function 336 can be configured to determine the respective coefficient value for each subcarrier for which a DMRS is transmitted during that DMRS symbol using the associated baseband IQ data and to determine the respective coefficient value for each subcarrier for which a DMRS is not transmitted during that DMRS symbol by interpolating coefficient values determined for the subcarriers for which a DMRS is transmitted during that DMRS symbol.

The channel estimate adaptation function 330 also includes a scaling function 338 that is configured to determine a set of scaling factors for each pre-DMRS data symbol based on the deviation between the predicted channel estimate CE0 determined for that pre-DMRS data symbol and the DMRS-based channel estimate CE1 determined for the slot. The set of scaling factors for each pre-DMRS data symbol can be applied to the results of performing the first portion 340 of uplink receive processing for that pre-DMRS data symbol using only the predicted channel estimate CE0 for that pre-DMRS data symbol LLRs. The set of scaling factors is applied in order to scale or otherwise adjust those results to account for any deviation between the predicted channel estimate CE0 determined for that pre-DMRS data symbol and the DMRS-based channel estimate CE1 determined for the slot.

In the exemplary embodiment described here in connection with the uplink receiver chain 300 shown in FIG. 3, both the predicted channel estimate CE0 and the DMRS-based channel estimate CE1 comprise a set of coefficients, one for each subcarrier and suitable for use in the channel estimation and equalization function 304 to perform the equalization of the corresponding frequency-domain IQ sample for that subcarrier of a data symbol.

The scaling function 338 determines a respective scaling factor for each subcarrier used for communicating data during each pre-DMRS data symbol that is based on the deviation, with respect to that subcarrier and the associated coefficient value, between the DMRS-based channel estimate CE1 determined for the associated slot and the predicted channel estimate CE0 determined for that pre-DMRS data symbol. Each scaling factor is itself scaled based on the number of bits communicated using the corresponding subcarrier during that pre-DMRS data symbol (that is, based on the number of LLR values). For each subcarrier of each pre-DMSR data symbol, the scaling factor determined for that subcarrier and pre-DMRS data symbol can be applied to each LLR value resulting from performing the first portion 340 of the uplink receive processing for that subcarrier and pre-DMRS data symbol. This can be done by an adaption function 346 during a portion 342 of the uplink receive processing. The resulting one or more scaled LLR values are used for the remaining portion 344 of the uplink receiving processing for that subcarrier and pre-DMRS data symbol.

By determining predicted data for the early data symbols, the uplink receive processing of the early data symbols can be started after sufficient baseband IQ data to determine such predicated data is received (that is, after the baseband IQ data for the first early data symbol is received) and need not be delayed until baseband IQ data required to determine the actual data is received. Doing this eliminates the added latency that would otherwise result from waiting until the latter type of baseband IQ data has been received before starting the uplink receive processing of the early data symbols. For example, in the exemplary embodiment described here in connection with the uplink receiver chain 300 shown in FIG. 3, by determining a predicted channel estimate CE0 for each pre-DMRS data symbol, the uplink receive processing of the pre-DMRS data symbols can be started after the first pre-DMRS data symbol is received and need not be delayed until after the first DMRS symbol has been received. Doing this eliminates the added latency that would otherwise result from waiting until the first DMRS symbol has been received before starting the uplink receive processing of the pre-DMRS data symbols.

In the examples set forth above, the fourth and eleventh symbols of each slot are used for transmitting reference symbols. However, it is to be understood that this is just one example and that the techniques described here can be used in other ways (for example, to receive and process uplink 5G NR transmissions with other reference symbol configurations and numerologies or to receive and process uplink 4G LTE transmissions).

Other embodiments are implemented in other ways.

The processing associated with method 400 is described above as being performed to process early data symbols for a slot. Later data symbols for the slot can be processed in a conventional manner (that is, using the actual data for the slot). Alternatively, these later data symbols can be processed in the same way as the early data symbols. For example, in the exemplary embodiment described here in connection with the uplink receiver chain 300 shown in FIG. 3, the processing associated with method 400 is described above as being performed to process pre-DMRS data symbols. Post-DMRS data symbols can be processed in a conventional manner (that is, performing the channel estimation and equalization function 304 using the DMRS-based channel estimate CE1 such that the adaptation function 346 need not be performed). Alternatively, post-DMRS data symbols can be processed in the same way as the pre-DMRS data symbols.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes an apparatus for use in implementing a base station to provide wireless service, the apparatus comprising: an uplink receiver chain configured to process a plurality of data symbols for a slot; wherein the apparatus is configured to do the following: receive first baseband IQ data and second baseband IQ data for said slot; determine predicted data for said one or more early data symbols of said slot based on the first baseband IQ data received for said slot, the predicted data for said one or more early data symbols of said slot comprising a predicted version of data used at some point in performing a first portion of uplink receive processing for said one or more early data symbols of said slot; perform the first portion of the uplink receive processing for said one or more early data symbols of said slot using the predicted data in order to produce preliminary output data for said one or more early data symbols of said slot; determine actual data corresponding to the predicted data, the actual data determined based on at least the second baseband IQ data received for said slot; and, in connection with performing a remaining portion of the uplink receive processing for said one or more early data symbols, adapt the preliminary output data for said one or more early data symbols of said slot based on the actual data.

Example 2 includes the apparatus of Example 1, wherein the uplink symbols comprise a plurality of data symbols and at least one demodulation reference signal (DMRS) symbol, the plurality of data symbols for said slot comprising one or more pre-DMRS data symbols that precede a first DMRS symbol for said slot; wherein said one or more early data symbols comprise the one or more pre-DMRS data symbols for said slot; and wherein the first baseband IQ data comprises baseband IQ data received by the apparatus for the one or more pre-DMRS data symbols of said slot.

Example 3 includes the apparatus of Example 2, wherein the predicted data comprises respective predicted channel estimates for the one or more pre-DMRS data symbols of said slot, wherein the one or more predicted channel estimates are determined based on the baseband IQ data received for the one or more pre-DMRS data symbol of said slot; wherein the apparatus is configured to perform the first portion of the uplink receive processing for the one or more pre-DMRS data symbols using the predicted channel estimates determined for the one or more pre-DMRS data symbols of said slot in order to produce the preliminary output data for the one or more pre-DMRS data symbols of said slot; wherein the actual data corresponding to the predicted data comprises a DMRS-based channel estimate for said slot, wherein the DMRS-based channel estimate is determined based on the baseband IQ data received for the first DMRS symbol for said slot; and wherein the apparatus is configured to, in connection with performing the remaining portion of the uplink receive processing for the one or more pre-DMRS data symbols, adapt the preliminary output data for the one or more pre-DMRS data symbols of said slot based on the DMRS-based channel estimate for said slot.

Example 4 includes the apparatus of Example 3, wherein the one or more pre-DMRS data symbols comprise the first three data symbols of said slot and the first DMRS symbol comprises the fourth symbol of said slot.

Example 5 includes the apparatus of any of Examples 3-4, wherein the uplink receiver chain comprises a predictive channel estimation function that is configured to predict coefficient values for the DMRS-based channel estimate for said slot that will be determined from the DMRSs that will subsequently be transmitted during the first DMRS symbol of said slot.

Example 6 includes the apparatus of Example 5, wherein the DMRS-based channel estimate for said slot comprises a plurality of coefficient values, each of a plurality of subcarriers having a respective coefficient value included in the plurality of coefficient values; and wherein the respective predicted channel estimates for the one or more pre-DMRS data symbols of said slot comprises a respective predicted value for each of the coefficient values of the DMRS-based channel estimate for said slot.

Example 7 includes the apparatus of Example 6, wherein the predictive channel estimation function comprises a predicted weight function and an interpolated weight function; wherein, for each pre-DMRS data symbol of said slot, the predictive channel estimation function is configured so that the predicted weight function determines the respective predicted value for each subcarrier for which data is transmitted during that pre-DMRS data symbol using the associated baseband IQ data; and wherein, for each pre-DMRS data symbol of said slot, the predictive channel estimation function is configured so that the interpolated weight function determines the respective predicted value for each subcarrier for which data is not transmitted during that pre-DMRS data symbol by interpolation.

Example 8 includes the apparatus of Example 7, wherein, for each pre-DMRS data symbol of said slot, the predicted weight function is configured to determine the respective predicted values for the subcarriers for which data is transmitted during that pre-DMRS data symbol using received signal strength indicator (RSSI) values determined from the respective baseband IQ data received for those subcarriers during that pre-DMRS data symbol.

Example 9 includes the apparatus of any of Examples 7-8, wherein, for each pre-DMRS data symbol of said slot, the predicted weight function is configured to determine the respective predicted values for the subcarriers for which data is transmitted during that pre-DMRS data symbol by adapting the corresponding coefficient values included in the DMRS-based channel estimate determined for a prior slot using the respective baseband IQ data received for those subcarriers during that pre-DMRS data symbol.

Example 10 includes the apparatus of any of Examples 7-9, wherein, for each pre-DMRS data symbol of said slot, the predicted weight function is configured to determine the respective predicted values for each subcarrier for which data is transmitted during that pre-DMRS data symbol by adapting respective moving averages of the corresponding coefficient values included in the DMRS-based channel estimates determined for a predetermined number of prior slots using the respective baseband IQ data received for that subcarrier during that pre-DMRS data symbol.

Example 11 includes the apparatus of any of Examples 3-10, wherein the apparatus is configured to adapt the preliminary output data for the one or more pre-DMRS data symbols of said slot based on the DMRS-based channel estimate for said slot by doing the following for each of the one or more pre-DMRS data symbols: determining a respective scaling factor for each subcarrier used for communicating data during that pre-DMRS data symbol that is based on the deviation, with respect to that subcarrier, between the DMRS-based channel estimate determined for said slot and the predicted channel estimate determined for that pre-DMRS data symbol of said slot; using the respective scaling factors determined for the subcarriers used for communicating data during that pre-DMRS data symbol to scale the respective results of performing the first portion of uplink receive processing for that pre-DMRS data symbol of said slot; and wherein the scaled respective results are used for performing the remaining portion of the uplink receive processing for that pre-DMRS data symbol.

Example 12 includes the apparatus of any of Examples 3-11, wherein the preliminary output data for each pre-DMRS data symbol comprises a respective set of log likelihood ratio (LLR) values; and wherein the apparatus is configured to adapt the respective set of LLR values resulting from performing the first portion of uplink receive processing for each pre-DMRS data symbol based on the DMRS-based channel estimate for said slot in order to produce a respective set of adapted LLR values that are used for performing the remaining portion of the uplink receive processing for that pre-DMRS data symbol.

Example 13 includes the apparatus of any of Examples 3-12, wherein said first portion of the uplink receive processing for the one or more pre-DMRS data symbols at least comprises a Minimum Mean Square Error (MMSE) equalization function.

Example 14 includes the apparatus of Example 13, wherein said remaining portion of the uplink receive processing for the one or more pre-DMRS data symbols at least comprises a low density parity check (LDPC) decoding function.

Example 15 includes the apparatus of any of Examples 1-14, wherein the wireless service comprises at least one of 4G LTE wireless service and 5G NR wireless service.

Example 16 includes the apparatus of any of Examples 1-15, wherein the apparatus is implemented as at least one of a physical network function and a virtual network function.

Example 17 includes the apparatus of any of Examples 1-16, further comprising at least one network interface to communicatively couple the DU to at least one remote unit (RU) used in implementing the base station.

Example 18 includes the apparatus of any of Examples 1-17, wherein the apparatus comprises at least one of a distributed unit (DU) and a baseband unit (BBU).

Example 19 includes software for use in implementing a base station to provide wireless service, the software comprising program instructions embodied on a non-transitory storage medium from which at least one programmable device reads at least some of the program instructions for execution thereby, wherein the program instructions are configured to implement an uplink receiver chain configured to process a plurality of uplink symbols for a slot, wherein the program instructions are further configured to cause the at least one programmable device to do the following: receive first baseband IQ data and second baseband IQ data for said slot; determine predicted data for said one or more early data symbols of said slot based on the first baseband IQ data received for said slot, the predicted data for said one or more early data symbols of said slot comprising a predicted version of data used at some point in performing a first portion of uplink receive processing for said one or more early data symbols of said slot; perform the first portion of the uplink receive processing for said one or more early data symbols of said slot using the predicted data in order to produce preliminary output data for said one or more early data symbols of said slot; determine actual data corresponding to the predicted data, the actual data determined based on at least the second baseband IQ data received for said slot; and, in connection with performing a remaining portion of the uplink receive processing for said one or more first uplink symbols, adapt the preliminary output data for said one or more early data symbols of said slot based on the actual data.

Example 20 includes the software of Example 19, wherein the uplink symbols comprise a plurality of data symbols and at least one demodulation reference signal (DMRS) symbol, the plurality of data symbols for said slot comprising one or more pre-DMRS data symbols that precede a first DMRS symbol for said slot; wherein said one or more early data symbols comprise the one or more pre-DMRS data symbols for said slot; and wherein the first baseband IQ data comprises baseband IQ data received by the apparatus for the one or more pre-DMRS data symbols of said slot.

Example 21 includes the software of Example 20, wherein the predicted data comprises respective predicted channel estimates for the one or more pre-DMRS data symbols of said slot, wherein the one or more predicted channel estimates are determined based on the baseband IQ data received for the one or more pre-DMRS data symbol of said slot; wherein the program instructions are further configured to cause the at least one programmable device to perform the first portion of the uplink receive processing for the one or more pre-DMRS data symbols using the predicted channel estimates determined for the one or more pre-DMRS data symbols of said slot in order to produce the preliminary output data for the one or more pre-DMRS data symbols of said slot; wherein the actual data corresponding to the predicted data comprises a DMRS-based channel estimate for said slot, wherein the DMRS-based channel estimate is determined based on the baseband IQ data received for the first DMRS symbol for said slot; and wherein the program instructions are further configured to cause the at least one programmable device to, in connection with performing the remaining portion of the uplink receive processing for the one or more pre-DMRS data symbols, adapt the preliminary output data for the one or more pre-DMRS data symbols of said slot based on the DMRS-based channel estimate for said slot.

Example 22 includes the software of Example 21, wherein the software is used to implement at least one of a distributed unit (DU) and a baseband unit (BBU).

Example 23 includes a base station to provide wireless service, the base station comprising: at least one remote unit (RU) comprising at least one antenna; and at least one distributed unit (DU) comprising: a network interface to communicatively couple the DU to the RU; and an uplink receiver chain configured to process a plurality of uplink symbols for a slot; wherein the DU is configured to do the following: receive first baseband IQ data and second baseband IQ data for said slot; determine predicted data for said one or more early data symbols of said slot based on the first baseband IQ data received for said slot, the predicted data for said one or more early data symbols of said slot comprising a predicted version of data used at some point in performing a first portion of uplink receive processing for said one or more early data symbols of said slot; perform the first portion of the uplink receive processing for said one or more early data symbols of said slot using the predicted data in order to produce preliminary output data for said one or more early data symbols of said slot; determine actual data corresponding to the predicted data, the actual data determined based on at least the second baseband IQ data received for said slot; and, in connection with performing a remaining portion of the uplink receive processing for said one or more first uplink symbols, adapt the preliminary output data for said one or more early data symbols of said slot based on the actual data.

Example 24 includes the base station of Example 23, wherein the uplink symbols comprise a plurality of data symbols and at least one demodulation reference signal (DMRS) symbol, the plurality of data symbols for said slot comprising one or more pre-DMRS data symbols that precede a first DMRS symbol for said slot; wherein said one or more early data symbols comprise the one or more pre-DMRS data symbols for said slot; and wherein the first baseband IQ data comprises baseband IQ data received by the apparatus for the one or more pre-DMRS data symbols of said slot.

Example 25 includes the base station of any of Examples 23-24, wherein the predicted data comprises respective predicted channel estimates for the one or more pre-DMRS data symbols of said slot, wherein the one or more predicted channel estimates are determined based on the baseband IQ data received for the one or more pre-DMRS data symbol of said slot; wherein the DU is configured to perform the first portion of the uplink receive processing for the one or more pre-DMRS data symbols using the predicted channel estimates determined for the one or more pre-DMRS data symbols of said slot in order to produce the preliminary output data for the one or more pre-DMRS data symbols of said slot; wherein the actual data corresponding to the predicted data comprises a DMRS-based channel estimate for said slot, wherein the DMRS-based channel estimate is determined based on the baseband IQ data received for the first DMRS symbol for said slot; and wherein the DU is configured to cause the at least one programmable device to, in connection with performing the remaining portion of the uplink receive processing for the one or more pre-DMRS data symbols, adapt the preliminary output data for the one or more pre-DMRS data symbols of said slot based on the DMRS-based channel estimate for said slot.

Example 26 includes method of uplink receive processing of a plurality of uplink symbols for a slot, the method comprising: receiving first baseband IQ data and second baseband IQ data for said slot; determining predicted data for said one or more early data symbols of said slot based on the first baseband IQ data received for said slot, the predicted data for said one or more early data symbols of said slot comprising a predicted version of data used at some point in performing a first portion of uplink receive processing for said one or more early data symbols of said slot; determining predicted data for performing a first portion of uplink receive processing for one or more uplink symbols of said slot, wherein the predicted data for said one or more early data symbols of said slot is determined based on the first baseband IQ data received for said slot; performing the first portion of the uplink receive processing for said one or more early data symbols of said slot using the predicted data in order to produce preliminary output data for said one or more early data symbols of said slot; determining actual data corresponding to the predicted data, the actual data determined based on at least the second baseband IQ data received for said slot; and, in connection with performing a remaining portion of the uplink receive processing for said one or more first uplink symbols, adapting the preliminary output data for said one or more early data symbols of said slot based on the actual data.

Example 27 includes the method of Example 26, wherein the uplink symbols comprise a plurality of data symbols and at least one demodulation reference signal (DMRS) symbol, the plurality of data symbols for said slot comprising one or more pre-DMRS data symbols that precede a first DMRS symbol for said slot; wherein said one or more early data symbols comprise the one or more pre-DMRS data symbols for said slot; and wherein the first baseband IQ data comprises baseband IQ data received by the apparatus for the one or more pre-DMRS data symbols of said slot.

Example 28 includes the method of Example 27, wherein the predicted data comprises respective predicted channel estimates for the one or more pre-DMRS data symbols of said slot, wherein the one or more predicted channel estimates are determined based on the baseband IQ data received for the one or more pre-DMRS data symbol of said slot; wherein performing the first portion of the uplink receive processing for said one or more early data symbols of said slot using the predicted data comprises performing the first portion of the uplink receive processing for the one or more pre-DMRS data symbols using the predicted channel estimates determined for the one or more pre-DMRS data symbols of said slot in order to produce the preliminary output data for the one or more pre-DMRS data symbols of said slot; wherein the actual data corresponding to the predicted data comprises a DMRS-based channel estimate for said slot, wherein the DMRS-based channel estimate is determined based on the baseband IQ data received for the first DMRS symbol for said slot; and wherein adapting the preliminary output data for said one or more early data symbols of said slot comprises, in connection with performing the remaining portion of the uplink receive processing for the one or more pre-DMRS data symbols, adapting the preliminary output data for the one or more pre-DMRS data symbols of said slot based on the DMRS-based channel estimate for said slot.

Example 29 includes the method of Example 28, wherein the one or more pre-DMRS data symbols comprise the first three data symbols of said slot and the first DMRS symbol comprises the fourth symbol of said slot.

Example 30 includes the method of any of Examples 28-29, wherein the uplink receiver chain comprises a predictive channel estimation function that is configured to predict coefficient values for the DMRS-based channel estimate for said slot that will be determined from the DMRSs that will subsequently be transmitted during the first DMRS symbol of said slot.

Example 31 includes the method of Example 30, wherein the DMRS-based channel estimate for said slot comprises a plurality of coefficient values, each of a plurality of subcarriers having a respective coefficient value included in the plurality of coefficient values; and wherein the respective predicted channel estimates for the one or more pre-DMRS data symbols of said slot comprises a respective predicted value for each of the coefficient values of the DMRS-based channel estimate for said slot.

Example 32 includes the method of Example 31, wherein the predictive channel estimation function comprises a predicted weight function and an interpolated weight function; wherein, for each pre-DMRS data symbol of said slot, the predictive channel estimation function is configured so that the predicted weight function determines the respective predicted value for each subcarrier for which data is transmitted during that pre-DMRS data symbol using the associated baseband IQ data; and wherein, for each pre-DMRS data symbol of said slot, the predictive channel estimation function is configured so that the interpolated weight function determines the respective predicted value for each subcarrier for which data is not transmitted during that pre-DMRS data symbol by interpolation.

Example 33 includes the method of Example 32, wherein, for each pre-DMRS data symbol of said slot, the predicted weight function is configured to determine the respective predicted values for the subcarriers for which data is transmitted during that pre-DMRS data symbol using received signal strength indicator (RSSI) values determined from the respective baseband IQ data received for those subcarriers during that pre-DMRS data symbol.

Example 34 includes the method of any of Examples 32-33, wherein, for each pre-DMRS data symbol of said slot, the predicted weight function is configured to determine the respective predicted values for the subcarriers for which data is transmitted during that pre-DMRS data symbol by adapting the corresponding coefficient values included in the DMRS-based channel estimate determined for a prior slot using the respective baseband IQ data received for those subcarriers during that pre-DMRS data symbol.

Example 35 includes the method of any of Examples 32-34, wherein, for each pre-DMRS data symbol of said slot, the predicted weight function is configured to determine the respective predicted values for each subcarrier for which data is transmitted during that pre-DMRS data symbol by adapting respective moving averages of the corresponding coefficient values included in the DMRS-based channel estimates determined for a predetermined number of prior slots using the respective baseband IQ data received for that subcarrier during that pre-DMRS data symbol.

Example 36 includes the method of any of Examples 28-35, wherein adapting the preliminary output data for the one or more pre-DMRS data symbols of said slot based on the DMRS-based channel estimate for said slot by doing the following for each of the one or more pre-DMRS data symbols: determining a respective scaling factor for each subcarrier used for communicating data during that pre-DMRS data symbol that is based on the deviation, with respect to that subcarrier, between the DMRS-based channel estimate determined for said slot and the predicted channel estimate determined for that pre-DMRS data symbol of said slot; using the respective scaling factors determined for the subcarriers used for communicating data during that pre-DMRS data symbol to scale the respective results of performing the first portion of uplink receive processing for that pre-DMRS data symbol of said slot; and wherein the scaled respective results are used for performing the remaining portion of the uplink receive processing for that pre-DMRS data symbol.

Example 37 includes the method of any of Examples 28-36, wherein the preliminary output data for each pre-DMRS data symbol comprises a respective set of log likelihood ratio (LLR) values; and wherein the respective set of LLR values resulting from performing the first portion of uplink receive processing for each pre-DMRS data symbol is adapted based on the DMRS-based channel estimate for said slot in order to produce a respective set of adapted LLR values that are used for performing the remaining portion of the uplink receive processing for that pre-DMRS data symbol.

Example 38 includes the method of any of Examples 28-37, wherein said first portion of the uplink receive processing for the one or more pre-DMRS data symbols at least comprises a Minimum Mean Square Error (MMSE) equalization function.

Example 39 includes the method of Example 38, wherein said remaining portion of the uplink receive processing for the one or more pre-DMRS data symbols at least comprises a low density parity check (LDPC) decoding function.

Example 40 includes the method of any of Examples 26-39, wherein the wireless service comprises at least one of 4G LTE wireless service and 5G NR wireless service.

What is claimed is:

1. An apparatus for use in implementing a base station to provide wireless service, the apparatus comprising:
an uplink receiver chain configured to process a plurality of uplink symbols for a slot, the plurality of uplink symbols for said slot including one or more early data symbols of said slot;
wherein the apparatus is configured to do the following:
receive first baseband IQ data and second baseband IQ data for said slot;
determine predicted data for said one or more early data symbols of said slot based on the first baseband IQ data received for said slot, the predicted data for said one or more early data symbols of said slot comprising a predicted version of data used at some point in performing a first portion of uplink receive processing for said one or more early data symbols of said slot;
perform the first portion of the uplink receive processing for said one or more early data symbols of said slot using the predicted data in order to produce preliminary output data for said one or more early data symbols of said slot;
determine actual data corresponding to the predicted data, the actual data determined based on at least the second baseband IQ data received for said slot; and
in connection with performing a remaining portion of the uplink receive processing for said one or more early data symbols, adapt the preliminary output data for said one or more early data symbols of said slot based on the actual data.

2. The apparatus of claim 1, wherein the uplink symbols for said slot comprise a plurality of data symbols for said slot and at least one demodulation reference signal (DMRS) symbol for said slot, the plurality of data symbols for said slot comprising said one or more early data symbols of said slot;

wherein said one or more early data symbols of said slot comprise one or more pre-DMRS data symbols of said slot that precede a first DMRS symbol for said slot; and wherein the first baseband IQ data comprises baseband IQ data received by the apparatus for the one or more pre-DMRS data symbols of said slot.

3. The apparatus of claim 2, wherein the predicted data comprises respective predicted channel estimates for the one or more pre-DMRS data symbols of said slot, wherein the one or more predicted channel estimates are determined based on the baseband IQ data received for the one or more pre-DMRS data symbol of said slot;

wherein the apparatus is configured to perform the first portion of the uplink receive processing for the one or more pre-DMRS data symbols using the predicted channel estimates determined for the one or more pre-DMRS data symbols of said slot in order to produce the preliminary output data for the one or more pre-DMRS data symbols of said slot;

wherein the actual data corresponding to the predicted data comprises a DMRS-based channel estimate for said slot, wherein the DMRS-based channel estimate is determined based on the baseband IQ data received for the first DMRS symbol for said slot; and wherein the apparatus is configured to, in connection with performing the remaining portion of the uplink receive processing for the one or more pre-DMRS data symbols, adapt the preliminary output data for the one or more pre-DMRS data symbols of said slot based on the DMRS-based channel estimate for said slot.

4. The apparatus of claim 3, wherein the uplink symbols for said slot comprise a first three symbols of said slot and a fourth symbol of said slot, wherein the first three symbols of said slot comprise a first three data symbols of said slot, wherein the plurality of data symbols for said slot comprises the first three data symbols of said slot, wherein the one or more pre-DMRS data symbols comprise the first three data symbols of said slot and the first DMRS symbol for said slot comprises the fourth symbol of said slot.

5. The apparatus of claim 3, wherein the uplink receiver chain comprises a predictive channel estimation function that is configured to predict coefficient values for the DMRS-based channel estimate for said slot that will be determined from the DMRSs that will subsequently be transmitted during the first DMRS symbol of said slot.

6. The apparatus of claim 5, wherein the DMRS-based channel estimate for said slot comprises a plurality of coefficient values, each of a plurality of subcarriers having a respective coefficient value included in the plurality of coefficient values; and wherein the respective predicted channel estimates for the one or more pre- DMRS data symbols of said slot comprises a respective predicted value for each of the coefficient values of the DMRS-based channel estimate for said slot.

7. The apparatus of claim 6, wherein the predictive channel estimation function comprises a predicted weight function and an interpolated weight function;

wherein, for each pre-DMRS data symbol of said slot, the predictive channel estimation function is configured so that the predicted weight function determines the respective predicted value for each subcarrier for which data is transmitted during that pre-DMRS data symbol using the associated baseband IQ data; and wherein, for each pre-DMRS data symbol of said slot, the predictive channel estimation function is configured so that the interpolated weight function determines the respective predicted value for each subcarrier for which data is not transmitted during that pre-DMRS data symbol by interpolation.

8. The apparatus of claim 7, wherein, for each pre-DMRS data symbol of said slot, the predicted weight function is configured to determine the respective predicted values for the subcarriers for which data is transmitted during that pre-DMRS data symbol using received signal strength indicator (RSSI) values determined from the respective baseband IQ data received for those subcarriers during that pre-DMRS data symbol.

9. The apparatus of claim 7, wherein, for each pre-DMRS data symbol of said slot, the predicted weight function is configured to determine the respective predicted values for the subcarriers for which data is transmitted during that pre-DMRS data symbol by adapting the corresponding coefficient values included in the DMRS-based channel estimate determined for a prior slot using the respective baseband IQ data received for those subcarriers during that pre-DMRS data symbol.

10. The apparatus of claim 7, wherein, for each pre-DMRS data symbol of said slot, the predicted weight function is configured to determine the respective predicted values for each subcarrier for which data is transmitted during that pre-DMRS data symbol by adapting respective moving averages of the corresponding coefficient values included in the DMRS-based channel estimates determined for a predetermined number of prior slots using the respective baseband IQ data received for that subcarrier during that pre-DMRS data symbol.

11. The apparatus of claim 3, wherein the apparatus is configured to adapt the preliminary output data for the one or more pre-DMRS data symbols of said slot based on the DMRS-based channel estimate for said slot by doing the following for each of the one or more pre-DMRS data symbols:

determining a respective scaling factor for each subcarrier used for communicating data during that pre-DMRS data symbol that is based on the deviation, with respect to that subcarrier, between the DMRS-based channel estimate determined for said slot and the predicted channel estimate determined for that pre-DMRS data symbol of said slot;

using the respective scaling factors determined for the subcarriers used for communicating data during that pre-DMRS data symbol to scale the respective results of performing the first portion of uplink receive processing for that pre-DMRS data symbol of said slot; and wherein the scaled respective results are used for performing the remaining portion of the uplink receive processing for that pre-DMRS data symbol.

12. The apparatus of claim 3, wherein the preliminary output data for each pre-DMRS data symbol comprises a respective set of log likelihood ratio (LLR) values; and wherein the apparatus is configured to adapt the respective set of LLR values resulting from performing the first portion of uplink receive processing for each pre-DMRS data symbol based on the DMRS-based channel estimate for said slot in order to produce a respective set of adapted LLR values that are used for performing the remaining portion of the uplink receive processing for that pre-DMRS data symbol.

13. The apparatus of claim 3, wherein said first portion of the uplink receive processing for the one or more pre-DMRS data symbols at least comprises a Minimum Mean Square Error (MMSE) equalization function.

14. The apparatus of claim 13, wherein said remaining portion of the uplink receive processing for the one or more pre-DMRS data symbols at least comprises a low density parity check (LDPC) decoding function.

15. The apparatus of claim 1, wherein the wireless service comprises at least one of 4G LTE wireless service and 5G NR wireless service.

16. The apparatus of claim 1, wherein the apparatus is implemented as at least one of a physical network function and a virtual network function.

17. The apparatus of claim 1, further comprising at least one network interface to communicatively couple the DU to at least one remote unit (RU) used in implementing the base station.

18. The apparatus of claim 1, wherein the apparatus comprises at least one of a distributed unit (DU) and a baseband unit (BBU).

19. Software for use in implementing a base station to provide wireless service, the software comprising program instructions embodied on a non-transitory storage medium from which at least one programmable device reads at least some of the program instructions for execution thereby, wherein the program instructions are configured to implement an uplink receiver chain configured to process a plurality of uplink symbols for a slot, wherein the plurality of uplink symbols for said slot include one or more early data symbols of said slot, wherein the program instructions are further configured to cause the at least one programmable device to do the following:
receive first baseband IQ data and second baseband IQ data for said slot;
determine predicted data for said one or more early data symbols of said slot based on the first baseband IQ data received for said slot, the predicted data for said one or more early data symbols of said slot comprising a predicted version of data used at some point in performing a first portion of uplink receive processing for said one or more early data symbols of said slot;
perform the first portion of the uplink receive processing for said one or more early data symbols of said slot using the predicted data in order to produce preliminary output data for said one or more early data symbols of said slot;
determine actual data corresponding to the predicted data, the actual data determined based on at least the second baseband IQ data received for said slot; and
in connection with performing a remaining portion of the uplink receive processing for said one or more first uplink symbols, adapt the preliminary output data for said one or more early data symbols of said slot based on the actual data.

20. The software of claim 19, wherein the uplink symbols for said slot comprise a plurality of data symbols for said slot and at least one demodulation reference signal (DMRS) symbol for said slot, the plurality of data symbols for said slot comprising said one or more early data symbols of said slot;
wherein said one or more early data symbols of said slot comprise one or more pre-DMRS data symbols of said slot that precede a first DMRS symbol for said slot; and
wherein the first baseband IQ data comprises baseband IQ data received by the apparatus for the one or more pre-DMRS data symbols of said slot.

21. The software of claim 20, wherein the predicted data comprises respective predicted channel estimates for the one or more pre-DMRS data symbols of said slot, wherein the one or more predicted channel estimates are determined based on the baseband IQ data received for the one or more pre-DMRS data symbol of said slot;
wherein the program instructions are further configured to cause the at least one programmable device to perform the first portion of the uplink receive processing for the one or more pre-DMRS data symbols using the predicted channel estimates determined for the one or more pre-DMRS data symbols of said slot in order to produce the preliminary output data for the one or more pre-DMRS data symbols of said slot;
wherein the actual data corresponding to the predicted data comprises a DMRS-based channel estimate for said slot, wherein the DMRS-based channel estimate is determined based on the baseband IQ data received for the first DMRS symbol for said slot; and
wherein the program instructions are further configured to cause the at least one programmable device to, in connection with performing the remaining portion of the uplink receive processing for the one or more pre-DMRS data symbols, adapt the preliminary output data for the one or more pre-DMRS data symbols of said slot based on the DMRS-based channel estimate for said slot.

22. The software of claim 21, wherein the software is used to implement at least one of a distributed unit (DU) and a baseband unit (BBU).

23. A base station to provide wireless service, the base station comprising:
at least one remote unit (RU) comprising at least one antenna; and
at least one distributed unit (DU) comprising:
a network interface to communicatively couple the DU to the RU; and
an uplink receiver chain configured to process a plurality of uplink symbols for a slot, the plurality of uplink symbols for said slot including one or more early data symbols of said slot;
wherein the DU is configured to do the following:
receive first baseband IQ data and second baseband IQ data for said slot;
determine predicted data for said one or more early data symbols of said slot based on the first baseband IQ data received for said slot, the predicted data for said one or more early data symbols of said slot comprising a predicted version of data used at some point in performing a first portion of uplink receive processing for said one or more early data symbols of said slot;
perform the first portion of the uplink receive processing for said one or more early data symbols of said slot using the predicted data in order to produce preliminary output data for said one or more early data symbols of said slot;
determine actual data corresponding to the predicted data, the actual data determined based on at least the second baseband IQ data received for said slot; and
in connection with performing a remaining portion of the uplink receive processing for said one or more first uplink symbols, adapt the preliminary output data for said one or more early data symbols of said slot based on the actual data.

24. The base station of claim 23, wherein the uplink symbols for said slot comprise a plurality of data symbols for said slot and at least one demodulation reference signal (DMRS) symbol for said slot, the plurality of data symbols for said slot comprising said one or more early data symbols of said slot;

wherein said one or more early data symbols of said slot comprise the one or more pre-DMRS data symbols of said slot that precede a first DMRS symbol for said slot; and wherein the first baseband IQ data comprises baseband IQ data received by the apparatus for the one or more pre-DMRS data symbols of said slot.

25. The base station of claim 23, wherein the predicted data comprises respective predicted channel estimates for the one or more pre-DMRS data symbols of said slot, wherein the one or more predicted channel estimates are determined based on the baseband IQ data received for the one or more pre-DMRS data symbol of said slot;

wherein the DU is configured to perform the first portion of the uplink receive processing for the one or more pre-DMRS data symbols using the predicted channel estimates determined for the one or more pre-DMRS data symbols of said slot in order to produce the preliminary output data for the one or more pre-DMRS data symbols of said slot;

wherein the actual data corresponding to the predicted data comprises a DMRS-based channel estimate for said slot, wherein the DMRS-based channel estimate is determined based on the baseband IQ data received for the first DMRS symbol for said slot; and wherein the DU is configured to cause the at least one programmable device to, in connection with performing the remaining portion of the uplink receive processing for the one or more pre-DMRS data symbols, adapt the preliminary output data for the one or more pre-DMRS data symbols of said slot based on the DMRS-based channel estimate for said slot.

26. A method of uplink receive processing of a plurality of uplink symbols for a slot, the plurality of uplink symbols for said slot including one or more early data symbols of said slot, the method comprising:

receiving first baseband IQ data and second baseband IQ data for said slot;

determining predicted data for said one or more early data symbols of said slot based on the first baseband IQ data received for said slot, the predicted data for said one or more early data symbols of said slot comprising a predicted version of data used at some point in performing a first portion of uplink receive processing for said one or more early data symbols of said slot;

determining predicted data for performing a first portion of uplink receive processing for one or more uplink symbols of said slot, wherein the predicted data for said one or more early data symbols of said slot is determined based on the first baseband IQ data received for said slot;

performing the first portion of the uplink receive processing for said one or more early data symbols of said slot using the predicted data in order to produce preliminary output data for said one or more early data symbols of said slot;

determining actual data corresponding to the predicted data, the actual data determined based on at least the second baseband IQ data received for said slot; and in connection with performing a remaining portion of the uplink receive processing for said one or more first uplink symbols, adapting the preliminary output data for said one or more early data symbols of said slot based on the actual data.

27. The method of claim 26, wherein the uplink symbols for said slot comprise a plurality of data symbols for said slot and at least one demodulation reference signal (DMRS) symbol for said slot, the plurality of data symbols for said slot comprising said one or more early data symbols of said slot;

wherein said one or more early data symbols of said slot comprise the one or more pre-DMRS data symbols of said slot that precede a first DMRS symbol for said slot; and wherein the first baseband IQ data comprises baseband IQ data received by the apparatus for the one or more pre-DMRS data symbols of said slot.

28. The method of claim 27, wherein the predicted data comprises respective predicted channel estimates for the one or more pre-DMRS data symbols of said slot, wherein the one or more predicted channel estimates are determined based on the baseband IQ data received for the one or more pre-DMRS data symbol of said slot;

wherein performing the first portion of the uplink receive processing for said one or more early data symbols of said slot using the predicted data comprises performing the first portion of the uplink receive processing for the one or more pre-DMRS data symbols using the predicted channel estimates determined for the one or more pre-DMRS data symbols of said slot in order to produce the preliminary output data for the one or more pre-DMRS data symbols of said slot;

wherein the actual data corresponding to the predicted data comprises a DMRS-based channel estimate for said slot, wherein the DMRS-based channel estimate is determined based on the baseband IQ data received for the first DMRS symbol for said slot; and wherein adapting the preliminary output data for said one or more early data symbols of said slot comprises, in connection with performing the remaining portion of the uplink receive processing for the one or more pre-DMRS data symbols, adapting the preliminary output data for the one or more pre-DMRS data symbols of said slot based on the DMRS-based channel estimate for said slot.

29. The method of claim 28, wherein the uplink symbols for said slot comprise a first three symbols of said slot and a fourth symbol of said slot, wherein the first three symbols of said slot comprise a first three data symbols of said slot, wherein the plurality of data symbols for said slot comprises the first three data symbols of said slot, wherein the one or more pre-DMRS data symbols of said slot comprise the first three data symbols of said slot and the first DMRS symbol for said slot comprises the fourth symbol of said slot.

30. The method of claim 28, wherein the uplink receiver chain comprises a predictive channel estimation function that is configured to predict coefficient values for the DMRS-based channel estimate for said slot that will be determined from the DMRSs that will subsequently be transmitted during the first DMRS symbol of said slot.

31. The method of claim 30, wherein the DMRS-based channel estimate for said slot comprises a plurality of coefficient values, each of a plurality of subcarriers having a respective coefficient value included in the plurality of coefficient values; and wherein the respective predicted channel estimates for the one or more pre-DMRS data symbols of said slot comprises a respective predicted value for each of the coefficient values of the DMRS-based channel estimate for said slot.

32. The method of claim 31, wherein the predictive channel estimation function comprises a predicted weight function and an interpolated weight function;

wherein, for each pre-DMRS data symbol of said slot, the predictive channel estimation function is configured so that the predicted weight function determines the respective predicted value for each subcarrier for which data is transmitted during that pre-DMRS data symbol using the associated baseband IQ data; and wherein, for each pre-DMRS data symbol of said slot, the predictive channel estimation function is configured so that the interpolated weight function determines the respective predicted value for each subcarrier for which data is not transmitted during that pre-DMRS data symbol by interpolation.

33. The method of claim 32, wherein, for each pre-DMRS data symbol of said slot, the predicted weight function is configured to determine the respective predicted values for the subcarriers for which data is transmitted during that pre-DMRS data symbol using received signal strength indicator (RSSI) values determined from the respective baseband IQ data received for those subcarriers during that pre-DMRS data symbol.

34. The method of claim 32, wherein, for each pre-DMRS data symbol of said slot, the predicted weight function is configured to determine the respective predicted values for the subcarriers for which data is transmitted during that pre-DMRS data symbol by adapting the corresponding coefficient values included in the DMRS-based channel estimate determined for a prior slot using the respective baseband IQ data received for those subcarriers during that pre-DMRS data symbol.

35. The method of claim 32, wherein, for each pre-DMRS data symbol of said slot, the predicted weight function is configured to determine the respective predicted values for each subcarrier for which data is transmitted during that pre-DMRS data symbol by adapting respective moving averages of the corresponding coefficient values included in the DMRS-based channel estimates determined for a predetermined number of prior slots using the respective baseband IQ data received for that subcarrier during that pre-DMRS data symbol.

36. The method of claim 28, wherein adapting the preliminary output data for the one or more pre-DMRS data symbols of said slot based on the DMRS-based channel estimate for said slot by doing the following for each of the one or more pre- DMRS data symbols:

determining a respective scaling factor for each subcarrier used for communicating data during that pre-DMRS data symbol that is based on the deviation, with respect to that subcarrier, between the DMRS-based channel estimate determined for said slot and the predicted channel estimate determined for that pre-DMRS data symbol of said slot;

using the respective scaling factors determined for the subcarriers used for communicating data during that pre-DMRS data symbol to scale the respective results of performing the first portion of uplink receive processing for that pre-DMRS data symbol of said slot; and wherein the scaled respective results are used for performing the remaining portion of the uplink receive processing for that pre-DMRS data symbol.

37. The method of claim 28, wherein the preliminary output data for each pre-DMRS data symbol comprises a respective set of log likelihood ratio (LLR) values; and wherein the respective set of LLR values resulting from performing the first portion of uplink receive processing for each pre-DMRS data symbol is adapted based on the DMRS-based channel estimate for said slot in order to produce a respective set of adapted LLR values that are used for performing the remaining portion of the uplink receive processing for that pre-DMRS data symbol.

38. The method of claim 28, wherein said first portion of the uplink receive processing for the one or more pre-DMRS data symbols at least comprises a Minimum Mean Square Error (MMSE) equalization function.

39. The method of claim 38, wherein said remaining portion of the uplink receive processing for the one or more pre-DMRS data symbols at least comprises a low density parity check (LDPC) decoding function.

40. The method of claim 26, wherein the wireless service comprises at least one of 4G LTE wireless service and 5G NR wireless service.

* * * * *